United States Patent [19]

Schibler et al.

[11] 3,920,645
[45] Nov. 18, 1975

[54] CARBAMIDE-FORMALDEHYDE CONDENSATION PRODUCTS

[75] Inventors: Luzius Schibler, Riehen; Jurg Merz, Therwil, both of Switzerland

[73] Assignee: Ciba-Geigy AG, Basel, Switzerland

[22] Filed: Mar. 26, 1973

[21] Appl. No.: 344,671

[30] Foreign Application Priority Data
Mar. 28, 1972  Switzerland.................. 4632/72
Dec. 22, 1972  Switzerland................ 18727/72

[52] U.S. Cl. ........ 260/249.5; 260/249.6; 260/249.8; 260/249.9; 117/135.5; 117/139.5 CQ; 252/542; 8/183; 8/128 R
[51] Int. Cl.²................ C07D 251/42; C07D 251/50; C07D 251/70 C07D 251/48
[58] Field of Search........... 260/249.6, 249.8, 249.9, 260/249.5

[56] References Cited
UNITED STATES PATENTS

| | | | |
|---|---|---|---|
| 2,892,810 | 6/1959 | Albrecht...................... | 260/249.6 X |
| 3,519,627 | 7/1970 | Coats et al...................... | 260/249.6 |
| 3,679,589 | 7/1972 | Schnegelberger et al. .. | 260/249.6 X |

FOREIGN PATENTS OR APPLICATIONS

| | | | |
|---|---|---|---|
| 344,066 | 3/1960 | Switzerland..................... | 260/249.6 |
| 2,076,969 | 9/1971 | France............................. | 260/249.6 |
| 1,133,386 | 7/1962 | Germany ......................... | 260/249.6 |
| 1,186,468 | 2/1965 | Germany | |
| 1,468,541 | 11/1969 | Germany | |
| 942,875 | 11/1963 | United Kingdom | |
| 1,049,288 | 11/1966 | United Kingdom | |

*Primary Examiner*—John M. Ford
*Attorney, Agent, or Firm*—Joseph G. Kolodny; Edward McC. Roberts; Prabodh I. Almaula

[57] ABSTRACT

New carbamide-formaldehyde condensation products which possess at least one hydrophilic radical and at least one hydrophobic radical, wherein at least one hydrophobic radical is bonded directly or via an oxygen or

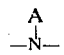

bridge, wherein A denotes hydrogen or alkyl with one to four carbon atoms, and at least one hydrophilic radical is bonded via a N-methylol-ether bridge, to an amino-1,3,5-triazine radical; these products are particularly useful as reactive surfaceactive agents.

8 Claims, No Drawings

CARBAMIDE-FORMALDEHYDE CONDENSATION PRODUCTS

The subject of the invention are carbamide-formaldehyde condensation products which possess at least one hydrophilic and at least one hydrophobic radical, characterised in that at least one hydrophobic radical is bonded directly or via an oxygen or

bridge, wherein A denotes hydrogen or alkyl with one to four carbon atoms, and at least one hydrophilic radical is bonded via a N-methylol-ether bridge, to an amino-1,3,5-triazine radical.

By a N-methylol-ether bridge there is to be understood, in the present case, a grouping of the formula $$>N-CH_2-O-  \qquad (1)$$

wherein the nitrogen belongs to an amino group of the 1,3,5-triazine radical and the oxygen is bonded to the hydrophilic radical. Optionally, it is also possible for two methylol radicals to be bonded to one nitrogen atom.

The amino-1,3,5-triazine radical is preferably a radical which is derived from 2,4-diamino- or 2,4,6-triamino-1,3,5-triazine.

The hydrophobic radical in the carbamide-formaldehyde condensation product is, for example, a saturated or unsaturated, cyclic or acyclic aliphatic radical, an aromatic radical or an araliphatic radical.

The hydrophilic radical is preferably derived from monoalkylene glycols or polyalkylene glycols or from alkanolamines.

Advantageous condensation products, contain as the hydrophobic radical, and alkyl or alkenyl radical with six to 22 carbon atoms, a cycloalkyl radical with five or six ring carbon atoms, an alkylphenyl radical with one to 12 carbon atoms in the alkyl part, a phenyl radical or a benzyl radical, and as the hydrophilic radical, a monoalkylene glycol or polyalkylene glycol radical of average molecular weight at most 2,000, especially 62 or 105 to 2,000, or above all 105 to 1,5000.

Compounds of particular interest are carbamide-formaldehyde condensation products of the formula

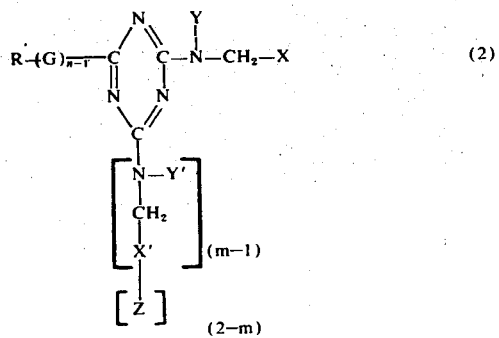

wherein R is alkyl or alkenyl with six to 22 carbon atoms, cycloalkyl with five to six ring carbon atoms, alkylphenyl with one to 12 carbon atoms in the alkyl part, phenyl or benzyl; G is oxygen or

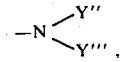

wherein A is hydrogen or alkyl with one to four carbon atoms; Z is halogen or

Y, Y', Y'' and Y''' each denote hydrogen, —CH$_2$—O—Q, wherein Q is hydrogen or alkyl with one to four carbon atoms, or —CH$_2$—X''; X, X' and X'' each denote a monoalkylene glycol or polyalkylene glycol radical bonded via an oxygen atom and having an average molecular weight of at most 2,000 and two to four carbon atoms per alkylene unit; and $n$ and $m$ each denote 1 or 2.

The hydrophobic radical or R is, for example, an alkyl radical such as n-hexyl, n-decyl, n-dodecyl, n-hexadecyl, n-octadecyl or behenyl; an alkenyl radical such as $\Delta^{9,10}$-decenyl, $\Delta^{9,10}$-dodecenyl, $\Delta^{9,10}$-hexadecenyl or $\Delta^{9,10}$-$\Delta^{12,13}$-octadecadienyl; a cycloalkyl radical such as cyclopentyl or cyclohexyl; an alkylphenyl radical such as 3,5-di-tert.butylphenyl, p-n-nonylphenyl or p-n-dodecylphenyl; phenyl or benzyl.

The alkyl radicals denoted A, are, for example, methyl, ethyl, isopropyl, n-propyl or n-butyl.

When Z is halogen it denotes, as a rule, iodine or preferably bromine or chlorine. Chlorine is the most suitable halogen.

The group —CH$_2$—O—Q in the definition of Y, Y', Y'' and Y''' represents a methylol group which is optionally etherified with an alkanol with one to four carbon atoms. The alkanol can here be, for example, methanol, ethanol, isopropanol, n-propanol or n-butanol. Y, Y', Y'' and Y''' preferably represent hydrogen, methoxymethyl or the CH$_2$—X'' group.

The radical X is derived from monoalkylene glycols or polyalkylene glycols which as a rule possess two to four, preferably two, carbon atoms per alkylene unit. Polyalkylene glycols, including also dialkylene glycols, are preferred to the monoalkylene glycols. The radical X is always bonded to the methylene group via one of its oxygen atoms. The alkylene glycol radicals can furthermore be terminally etherified with an alkanol with at most four carbon atoms, for example with n-butanol, n-propanol, ethanol or especially methanol. The non-etherified products are, however, preferred. The radicals X are derived, for example, from ethylene glycol, diethylene glycol, polyethylene glycol, 1,3-propylene glycol, 1,2-propylene glycol, polypropylene glycol, polybutylene glycol or polypropylene-polyethylene glycol.

Within the scope of the formula (2), condensation products of the formula

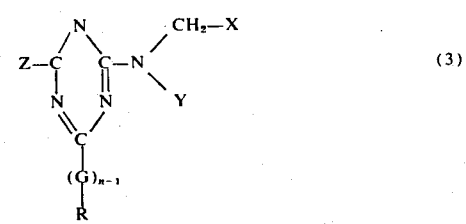

wherein Z, G, R, X, Y and n have the indicated meaning, occupy a preferred position.

The radical R in the formulae (2) and (3) is preferably bonded directly ($n = 1$) to the triazine ring.

Particularly suitable condensation products correspond to the formula

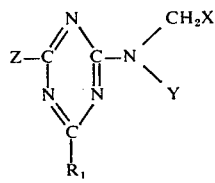 (4)

wherein $R_1$ denotes alkyl or alkenyl with six to 22 carbon atoms or phenyl, and X, Y and Z have the indicated meaning.

Amongst these compounds, those of the formula

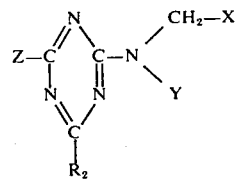 (5)

wherein $R_2$ denotes alkyl with 10 to 18 carbon atoms and X, Y and Z have the indicated meaning, are above all of interest.

Further compounds of outstanding interest are condensation products of the formula

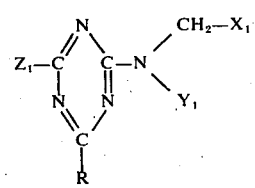 (6)

wherein $Z_1$ denotes chlorine or

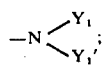

$Y_1$ and $Y_1'$ each denote hydrogen, —CH$_2$OQ or —CH$_2$—X$_1$; and $X_1$ denotes a polyethylene glycol radical of average molecular weight 105 to 1,500, bonded via an oxygen atom, and R and Q have the indicated meaning.

Condensation products of the formula

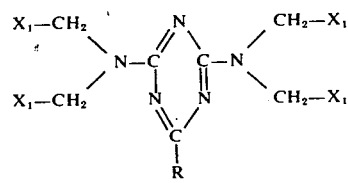 (7)

wherein R and $X_1$ have the indicated meaning, here enjoy particular preference.

Products of the formula

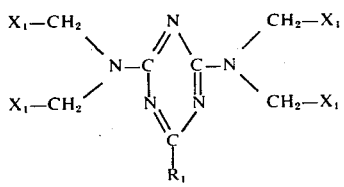 (8)

and especially the guanamine compound of the formula

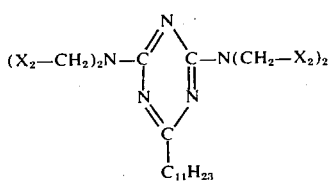 (9)

wherein $R_1$ and $X_1$ have the indicated meaning and $X_2$ is a polyethylene glycol radical of average molecular weight 300, bonded via an oxygen atom, have proved particularly advantageous.

The carbamide-formaldehyde condensation products according to the invention are manufactured by reacting (a) a carbamide-formaldehyde condensation product which contains at least one hydrophobic radical and which possesses at least one free N-methylol group, (b) with an alkylene glycol in the presence of a weak acid, at a temperature of 80° to 120°C and at a pressure of 1 to 30 mm Hg, or (c) with an alkylene oxide in the presence of a metal alcoholate of a transition metal of groups IV, V or VI of the periodic system and optionally of an alkali metal hydroxide or alkali metal alcoholate, at a temperature of 10° to 160°C and a pressure of 1 to 20 atmospheres gauge.

2,4-Diamino- or 2,4,6-triamino-1,3,5-triazine-formaldehyde condensation products which contain at least one hydrophobic radical bonded in the indicated manner, are preferentially used as the component (a). Condensation products which contain, as the hydrophobic radical according to the definition, alkyl or alkenyl with six to 22 carbon atoms, cycloalkyl with five or six ring carbon atoms, alkylphenyl with one to 12 carbon atoms in the alkyl part, phenyl or benzyl are of particular interest here.

Components (a) of outstanding interest correspond to the formula

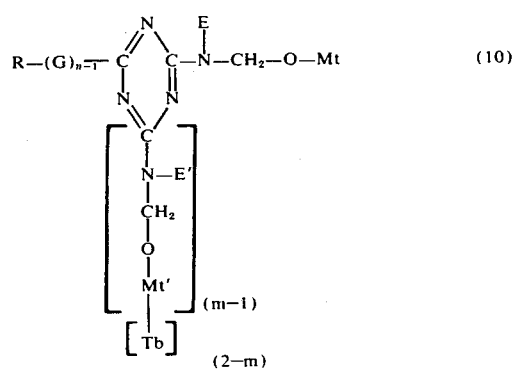 (10)

wherein R, G and n have the indicated meaning, Mt and Mt' each denote hydrogen or alkyl with one to four carbon atoms, Tb denotes halogen or

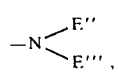

E, E', E'' and E''' each denotes hydrogen or —CH$_2$—O—Q, wherein Q is hydrogen or alkyl with one to four carbon atoms, and m denotes 1 or 2, and at least one N-methylol group is free.

The condensation products of the formula (3) are manufactured from 1,3,5-triazines of the formula

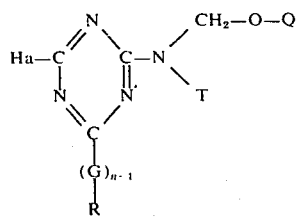

(11)

wherein R, G, Q and n have the indicated meaning, Ha denotes halogen or

and T and T' each denote hydrogen or —CH$_2$OQ, and at least one N-methylol group is free.

Compounds of the formulae (4) and (5) are obtained from components (a) of the formula

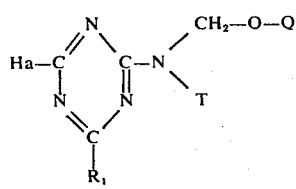

(12)

or of the formula

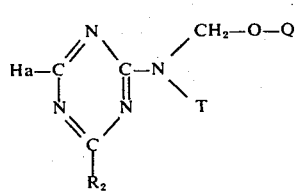

(13)

wherein R$_1$, R$_2$, Ha, T and Q have the indicated meaning and at least one N-methylol group is free.

Condensation products of the formula (6) are obtained when using a 1,3,5-triazine of the formula

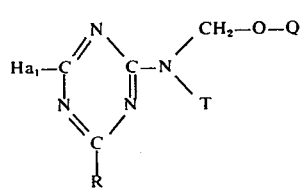

(14)

wherein Ha$_1$ denotes chlorine or

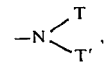

R, T, T' and Q have the indicated meaning and at least one N-methylol group is free, as the component (a).

Condensation products of the formula (7) are obtained from the 1,3,5-triazine of the formula

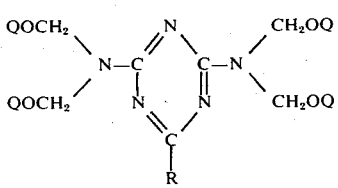

(15)

wherein R and Q have the indicated meaning and at least one Q is hydrogen.

The particularly suitable condensation products of the formula (8) are obtained from 1,3,5-triazines of the formula

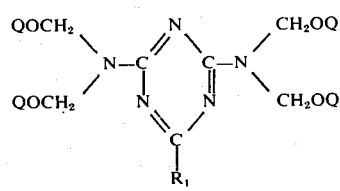

(16)

wherein Q and R$_1$ have the indicated meaning and at least one Q represents hydrogen.

The preferred condensation product of the formula (9) is obtained by reacting tetramethylol-lauroguanamine with a polyethylene glycol of average molecular weight 300.

The component (a) is now reacted either with (b) a polyalkylene glycol or (c) a alkylene oxide.

Polyalkylene glycols with an average molecular weight of at most 2,000, for example of 105 to 2,000, and with 2 to 4 carbon atoms per alkylene unit, especially polyethylene glycols with an average molecular weight of 105 to 1,500 or above all of about 300 have proved advantageous as the component (b). Possible polyalkylene glycols are, for example, polybutylene glycol or especially polypropylene glycol and above all polyethylene glycol.

The reaction with (b) is appropriately carried out in the presence of an alkanecarboxylic acid with one to three carbon atoms as the weak acid. Alongside formic acid and propionic acid, acetic acid above all has proved advantageous here. This reaction is preferably carried out at 90° to 100°C. The pressure is preferably 10 to 25 mm Hg.

After completion of the reaction it is desirable to neutralise the reaction product with a base. For this purpose, alkanolamines such as monoethanolamine, diethanolamine or especially triethanolamine can above all be used.

In the process variant wherein a reaction with the component (c) is carried out, alkylene oxides are to be understood as compounds which possess an epoxide grouping.

These include, for example, styrene oxide and diglycidyl ether, but preferably propylene oxide or above all ethylene oxide.

The reaction with the alkylene oxide is carried out in the presence of a metal alcoholate as the catalyst, which preferably corresponds to the formula $$Me(O-Ak)_r(B)_{q+r} \qquad (17)$$

wherein Me denotes a q-valent transition metal of groups IV, V or VI of the periodic system, Ak denotes phenyl, benzyl, cycloalkyl with at most 12, especially five to 12, above all eight to 12 ring carbon atoms or, preferably, an optionally halogen-substituted alkyl with one to four carbon atoms, B denotes halogen or alkoxy with one to four carbon atoms, r denotes 1 to q and q denotes 4, 5 or 6.

These metal alcoholates are, in particular, alcoholates of transition metals of groups IV, V and VI of the 4th, 5th or 6th period of the periodic system according to Lange's Handbook of Chemistry, 10th Edition, 1967, pages 60 and 61. These transition metals, also called elements of the intermediate groups, of the groups $a$ or the groups $b$, include titanium, zirconium, hafnium, vanadium, niobium, tantalum, chromium, molybdenum and tungsten. The radical —O—Ak is preferably a radical of an optionally chlorinated alkanol such as, for example, methanol, ethanol, β-chloroethanol, isopropanol, n-propanol, n-butanol, sec.- or tert.-butanol or of phenol, benzyl alcohol or a cycloalkanol with appropriately five to 12 carbon atoms, such as cyclododecanol. As halogen, B denotes, for example, bromine or preferably chlorine. As alkoxy, B is as a rule different from OAk and can be, for example, methoxy, ethoxy, propoxy or preferably butoxy.

The reaction with the component (c) is advantageously carried out in the presence of metal alcoholates of the formula $$Me_1(O-Ak_1)_q \qquad (18)$$

wherein $Me_1$ denotes niobium$^V$, tantalum$^V$, tungsten$^{VI}$, molybdenum$^{VI}$ zirconium$^{IV}$ or hafnium$^{IV}$, $Ak_1$ denotes alkyl with one to four carbon atoms and q denotes 4, 5 or 6, corresponding to the valency of the metal.

Particularly suitable metal alcoholates correspond to the formula $$Me_2(O-Ak_1)_{q1} \qquad (19)$$

wherein $Me_2$ denotes zirconium $^{IV}$, niobium$^V$, tantalum$^V$ or tungsten$^{VI}$ and $q_1$ denotes 4, 5 or 6 and $Ak_1$ has the indicated meaning.

The reaction with the component (c) is preferably carried out in the presence of an additional catalyst such as, for example, an alkali metal hydroxide or an alkali metal alcoholate of an alkanol with one to four carbon atoms.

Possible examples of representatives of such catalysts are lithium hydroxide, sodium hydroxide, potassium hydroxide, rubidium hydroxide or caesium hydroxide, or the corresponding alcoholates of alkanols as indicated for the alcoholates of the transition metals.

Preferably, sodium hydroxide or potassium hydroxide or a sodium alcoholate or potassium alcoholate of an alkanol with one to four carbon atoms is used as the additional catalyst.

The metal alcoholates, by themselves or mixed with alkali metal hydroxides or alkali metal alcoholates, are advantageously employed in amounts of 0.05 to 5%, preferably 0.1 to 2% but especially 0.4 to 1%, relative to the weight of the reaction mixture. Preferably, the two types of catalyst are used together.

Where the two types of catalyst are used together, the weight ratio of transition metal alcoholate to alkali metal hydroxide or alkali metal alcoholate is as a rule 9:1 to 1:9, preferably 4:1 to 1:4 or above all 7:3 to 3:7.

Typical representatives of the transition metal alcoholates are, for example:

| | |
|---|---|
| (20.1) | $Ta(OCH_3)_5$ |
| (20.2) | $Ta(OC_2H_5)_5$ |
| (20.3) | $Ta(O-CH(CH_3)_2)_5$ |
| (20.4) | $Ta(OC(CH_3)_3)_5$ |
| (20.5) | $Ta(O-$$)_5$ |
| (20.6) | $Nb(OCH_3)_5$ |
| (20.7) | $Nb(OC_2H_5)_5$ |
| (20.8) | $Nb(O-CH(CH_3)_2)_5$ |
| (20.9) | $Nb(OC(CH_3)_3)_5$ |
| (20.10) | $Nb(O-$$)_5$ |
| (20.11) | $W(OCH_3)_6$ |
| (20.12) | $W(OC(CH_3)_3)_6$ |
| (20.13) | $Hf(O-CH(CH_3)_2)_4$ |
| (20.14) | $Hf(O-C(CH_3)_3)_4$ |
| (20.15) | $Mo(O-CH(CH_3)_2)_6$ |
| (20.16) | $Mo(O-C(CH_3)_3)_6$ |
| (20.17) | $Ti(OC_2H_5)_4$ |
| (20.18) | $Ti(O-C(CH_3)_3)_4$ |
| (20.19) | $Zr(OC_2H_5)_4$ |
| (20.20) | $Zr(O-C(CH_3)_3)_4$ |
| (20.21) | $Ta(OCH_3)Cl_4$ |
| (20.22) | $Nb(OCH_3)_4Cl$ |
| (20.23) | $Ti(OC_4H_9)_4$ |
| (20.24) | $Zr(OCH_2CH_2Cl)_4$ |
| (20.25) | $TaOCH_3(OC(CH_3)_3)_4$ |
| (20.26) | $Zr(OCH_3)Cl_3$ |

Typical representatives of the alkali metal hydroxides and alkali metal alcoholates are, for example:

| | |
|---|---|
| (21.1) | LiOH |
| (21.2) | NaOH |
| (21.3) | KOH |
| (21.4) | $LiOCH_3$ |
| (21.5) | $NaOCH_3$ |
| (21.6) | $NaOC_2H_5$ |
| (21.7) | $NaOC(CH_3)_3$ |
| (21.8) | $KOCH_3$ |
| (21.9) | $KOC_2H_5$ |
| (21.10) | $KOC(CH_3)_3$ |

The temperature of the reaction with the component (c) is preferably 30° to 120°C or especially 40° to 90°C. Reaction can be carried out at atmospheric pressure or under excess pressure. Preferably, the pressure is 1 to 15 atmospheres gauge or in particular 1 to 11 atmospheres gauge. As a rule the reaction is carried out under so-called autogenic pressure, that is to say the pressure generated by the reaction mixture itself at the given temperature.

Depending on the end use of the reaction product 1 to 100, preferably 1 to 25, mols of the component (c) are as a rule added onto the component (a).

It can at times be appropriate to carry out the alkoxylation in the presence of a second alkoxide which does not participate in the actual reaction. For example, it is possible to carry out the reaction with ethylene oxide and use propylene oxide or dioxane as the reaction medium or as the suspending agent.

The reaction with the component (c) has the advantage that alkylene oxides can be added directly on to a N-methylolated aminotriazine compound under mild conditions, that is to say at relatively low temperatures and with a practically neutral catalyst system. As is known, N-methylolaminotriazine compounds are unstable in even a weakly acid medium and in a strongly alkaline medium they form polycondensates or split off formaldehyde and water.

Additions of, for example, ethylene oxide to an organic compound which possesses a mobile hydrogen atom are usually carried out at temperatures of 160° to 200°C. At such high temperatures, however, most N-methylol compounds are no longer stable, that is to say a degradation of the methylol groups takes place.

By virtue of the catalyst system used according to the invention it has now become possible successfully to carry out such addition reactions even at relatively low temperatures, that is to say at temperatures below 160°C, without any degradation of the methylol groups taking place.

The products according to the invention are in the main low molecular, monomeric products which can at most contain minor proportions of more highly condensed products.

The carbamide-formaldehyde condensation products according to the invention are reactive surface-active agents and can be employed wherever the use of reactive surface-active agents appears appropriate. After acidification, that is to say at pH values below about 5, these reactive condensation products separate out from the aqueous solution as insoluble hydrophobic resins.

By virtue of their methylol groups or etherified methylol groups, the products according to the invention are reactive and can be employed for various purposes, depending on the substitution. In particular, they are suitable for use as so-called reactive surface-active agents, that is to say as reactive surface-active products which under certain conditions, for example in an acid medium or at an elevated temperature, can be converted into an irreversibly insoluble state. They can be used, for example, in the manufacture of micro-capsules. They are furthermore distinguished by good foaming power and washing power and are suitable for use as washing agents, washing agent additives, emulsifiers, dispersing agents, additives to agents which confer hydrophobic properties, agents which confer a soft handle and hydrophilic properties and as carriers.

The examples which follow explain the invention without restricting it thereto. Therein, percentages are percentages by weight, throughout.

EXAMPLE 1

38.7 g (0.1 mol) of tetramethylollauroguanamine, 1,5 g of glacial acetic acid and 42 g of polyethylene glycol of average molecular weight 300 are introduced into a stirred vessel. The condensation is allowed to take place at a temperature of 90° to 100°C and a vacuum of 15 mm Hg, whilst 3 g of water, mixed with acetic acid, are distilled off.

79 g of a reactive surface-active agent which gives a clear solution in water and has good foaming power and washing power are obtained.

This condensation product in the main corresponds to the formula

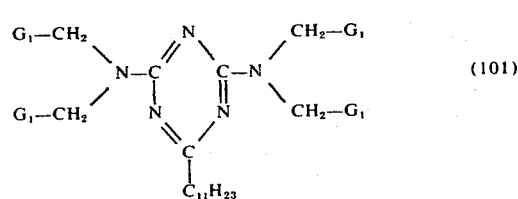

(101)

wherein $G_1$ represents a polyethylene glycol radical of average molecular weight 300, bonded via an oxygen atom.

EXAMPLE 2

351 g (1 mol) of octadecylguanamine of the formula (102.1) are dissolved in 1,000 g of ethanol and 500 g of 37.5% strength formaldehyde are added. After 30 minutes at 80°C under reflux the alcohol, as well as water and excess formaldehyde, are distilled off, and the residue is dried in vacuo at 60°C. 400 g of dimethyloloctadecylguanamine are obtained.

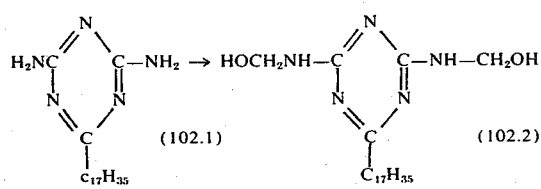

205 g (½ mol) of dimethyloloctadecylguanamine of the formula (102.2) are heated with 600 g of polyglycol ether of average molecular weight 600 in the presence of 5 g of glacial acetic acid for 3 hours in vacuo at 90° – 100°C, in the course of which a little dilute acetic acid and traces of formaldehyde distil off. Finally, the remainder of the glacial acetic acid is neutralised with triethanolamine and after cooling about 785 g of an ointment-like surface-active agent which readily dissolves in water to give a foaming solution are obtained.

This surface-active agent in the main corresponds to the formula

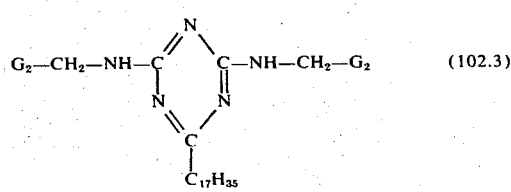

(102.3)

wherein $G_2$ represents a polyethylene glycol radical of average molecular weight 600, bonded via an oxygen atom.

EXAMPLE 3 a. 80 g (0.3 mol) of lauroylguanamine are fused in a round flask at 120°C and 8 g of triethanolamine are added while stirring (pH 8–10). 10 g of paraformaldehyde (2.4 mols) are introduced in 8 portions into this mixture, after which lauroylguanamine is methylolated.

After 4 hours, 128 g of a reaction product smelling of formaldehyde are obtained, which according to the formaldehyde analysis predominantly corresponds to the following formula:

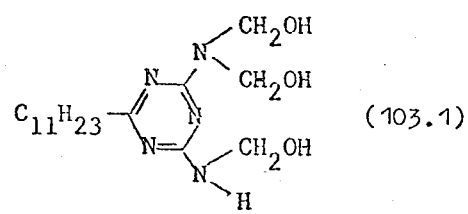

(103.1)

Measurement:
| | |
|---|---|
| bonded CH₂O, calculated | 25 % |
| total measured | 28.2 % |
| free measured | –4.0 % |
| bonded, measured | 24.2 % | b. 11.6 g (0.03 mol) of the intermediate product of the formula (103.1) are sealed with 6.6 g (0.15 mol) of ethylene oxide and 100 mg of Ta(OC₂H₅)₅ and shaken for 16 hours in an oil bath thermostatically controlled to 80°C, whereby 18.0 g of a waxy product are obtained. This corresponds to a yield of 99%.

The product corresponds in the main to the formula

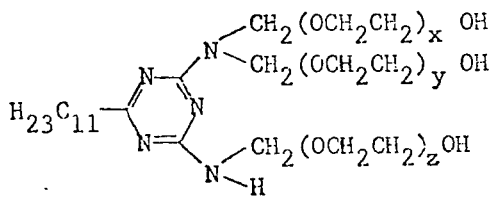

$$x + y + z = 5$$

(103.2)

EXAMPLE 4 a. 64 g of the reaction product of the formula (103.1), described in Example 3, are dissolved in 200 ml of boiling methanol and adjusted to pH 3 with 4 g of 37% strength hydrochloric acid. The etherification is carried out over the course of 15 minutes at 65°C. Thereafter, 25% strength aqueous NaOH solution is added dropwise until the solution has a pH of 6.5 – 7.0. The reaction mixture is filtered hot, carefully freed of excess methanol by evaporation, and dried in vacuo at 50°C. The yield of monoether is 64 g (96.2%) of a waxy product of predominantly the following formula:

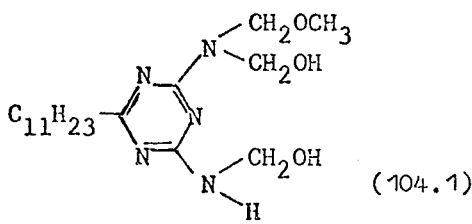

The formaldehyde determination gives the following results:

| | |
|---|---|
| bonded CH₂O, calculated | 24.3 % |
| total CH₂O, measured | 24.4 % |
| free CH₂O | approx. 1 % |
| bonded CH₂O | approx. 23.4 % | b. 6.5 g (0.0175 mol) of the intermediate product of the formula (104.1) from a) are sealed with 13.2 g (0.35 mol) of ethylene oxide and 100 mg of Ta-(OC₂H₅)₅ and shaken for 16 hours in an oil bath thermostatically controlled to 80°C, whereby 11.7 g of a waxy product are obtained. This corresponds to a yield of 60%.

The product corresponds in the main to the formula

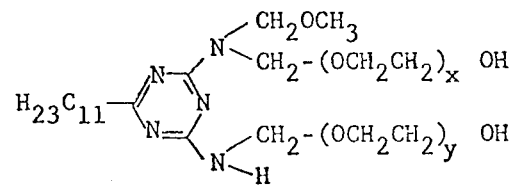

$$x + y = 20$$

(104.2)

EXAMPLE 5 a. 120 g (0.5 mol) of caprinoguanamine are fused in a round flask at 120°C and 12 g of triethanolamine are added whilst stirring (pH 8–10). 120 g of paraformaldehyde (4.0 mols) are introduced in portions into this mixture, whereby caprinoguanamine is methylolated. 170 g of a product which smells strongly of formaldehyde and which according to the formaldehyde analysis corresponds predominantly to the following formula

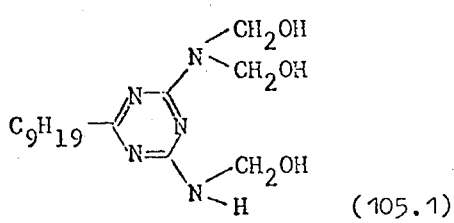

are obtained.

| | |
|---|---|
| CH₂O calculated | 27.3 % |
| total measured | 31.8 % |
| free | 6.0 % |
| bonded | 25.8 % | b. 6.1 g (0.018 mol) of the intermediate product of the formula (105.1) from (a) are sealed with 4.4 g (0.1 mol) of ethylene oxide and 100 mg of Ta(OC₂H₅)₅ and shaken for 16 hours in an oil bath thermostatically controlled to 80°C, whereby 10.5 g of a waxy product are obtained. This corresponds to a yield of 100%.

The product corresponds in the main to the formula

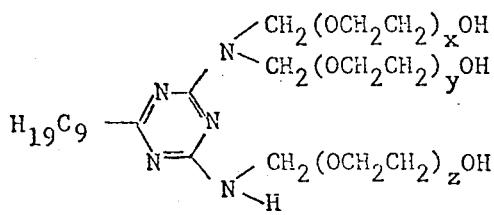

$$x + y + z = 5.6$$

(105.2)

EXAMPLE 6

*a.* 85 g (0.26 mol) of the reaction product of the formula (105.1) manufactured according to Example 5 (*a*) are dissolved in 200 ml of boiling methanol and the solution is adjusted to pH 3 with 5 g of 37% strength hydrochloric acid. The etherification is carried out at 65°C over the course of 15 minutes. Thereafter 25% NaOH solution is added dropwise until the solution has a pH of 6.5–7.0. The reaction mixture is filtered hot, carefully freed of excess methanol in vacuo and dried overnight in vacuo at 50°C, whereby 96 g of a somewhat waxy product are obtained, which on the basis of the formaldehyde analysis predominantly corresponds to the following formula:

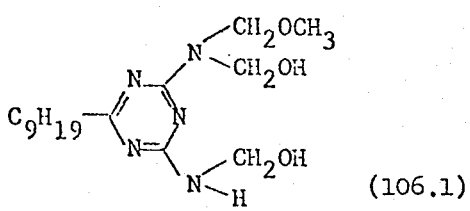

(106.1)

| | |
|---|---|
| $CH_2$ calculated | 26.2 % |
| total measured | 26.3 % |
| free | 2.0 % |
| bonded | 24.3 % |

*b.* 6 g (0.018 mol) of the intermediate product of the formula (106.1) from (*a*) are sealed with 8.8 g (0.2 mol) of ethylene oxide and 100 mg of $Ta(OC_2H_5)_5$ and shaken for 20 hours in an oil bath thermostatically controlled to 60°C, whereby 9.8 g of a waxy product are obtained. This corresponds to a yield of 68%.

The product corresponds in the main to the formula

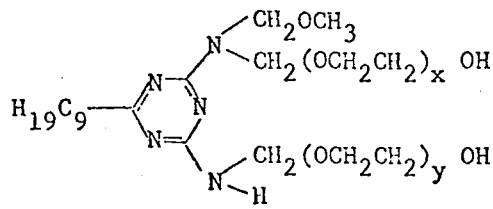

$$x + y = 11.1$$

(106.2)

EXAMPLE 7

*a.* 8.7 g (0.25 mol) of stearylguanamine are fused in a round flask at 120°C and 9 g of triethanolamine are added whilst stirring (pH 8–10). 2 portions of 30 g of paraformaldehyde (2.0 mols) are introduced into this mixture, whereupon 110 g of the methylolated compound of the formula

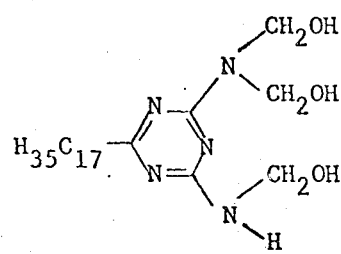

(107.1)

are obtained.

*b.* 55 g (0.125 mol) of this intermediate product are dissolved in 200 ml of boiling methanol, and the solution is adjusted to pH 3 with 4 g of 37% strength hydrochloric acid. The etherification is carried out for 15 minutes at 65°C. Thereafter 25% strength NaOH solution is added dropwise until the solution has a pH of 6.5–7.0. The reaction mixture is filtered hot and carefully freed of excess methanol by evaporation in vacuo, and dried in vacuo at 50°C. The yield of monoether is 60 g (98% of theory).

| | | |
|---|---|---|
| $CH_2O$ calculated (for trimethylol compound): | | 19.7 % |
| total measured | | 20.5 % |
| free | approx. | 1 % |
| bonded | | 19.5 % |

*c.* 7.4 g (0.017 mol) of the intermediate product from (*b*) are sealed with 13.2 g (0.3 mol) of ethylene oxide and 100 mg of $Ta(OC_2H_5)_5$ and shaken for 16 hours in an oil bath thermostatically controlled to 80°C, whereby 20 g of a waxy product are obtained. This corresponds to a yield of 94.5%.

This product corresponds in the main to the formula

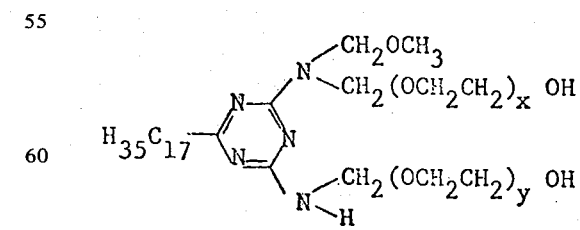

$$x + y = 17.6$$

(107.2)

EXAMPLE 8

7.95 g (0.017 mol) of the intermediate product of the formula (107.1) from Example 7 are sealed with 13.2 g (0.3 mol) of ethylene oxide and 100 mg of $Ta(OC_2H_5)_5$ and shaken for 16 hours in an oil bath thermostatically controlled to 80°C, whereby 20.5 g of a waxy product are obtained.

This corresponds to a yield of 99%.

This product in the main corresponds to the formula

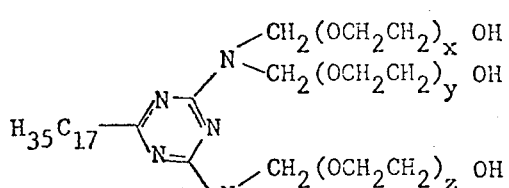

$$x + y + z = 17.7$$

(108)

Like the end product according to Example 7, this preparation also gives, in addition to the washing effect, very good water-repellent effects which are not only resistant to washing but also resistant to dry-cleaning and do not give a solvent ring.

EXAMPLE 9

100 mg of $Ta(OC(CH_3)_3)_5$, 6.6 g (corresponding to 6 mols) of ethylene oxide and 9.7 g of the compound of the formula

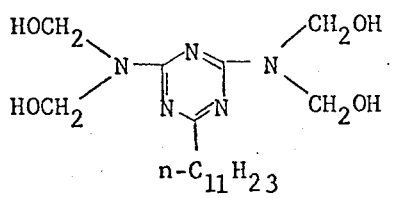

(109.1)

are sealed in a glass tube. This mixture is reacted for 16 hours at a pressure of 5.2 atmospheres gauge whilst shaking in a heating bath thermostatically controlled to 60°C, in the course of which 76% of the ethylene oxide undergoes addition. The reaction product in the main corresponds to the formula

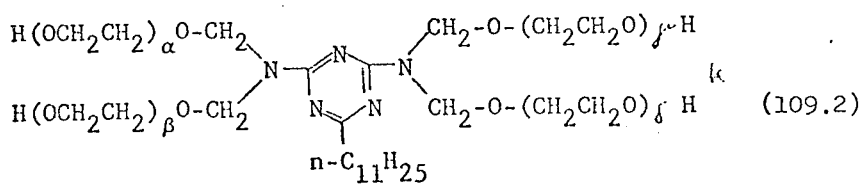

(109.2)

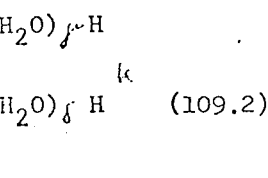

The infra-red spectrum of this product shows the following bands:

| | | | |
|---|---|---|---|
| Broad shoulder | band at approx. | 3,400 cm⁻¹ | strong |
| Sharp | " | 3,320 cm⁻¹ | medium-weak |
| Broad | " | 3,210 cm⁻¹ | medium |
| Sharp shoulder | " | 2,940 cm⁻¹ | medium-strong |
| Sharp | " | 2,910 cm⁻¹ | weak |
| Sharp | " | 2,830 cm⁻¹ | strong |
| Broad shoulder | " | 2,720 cm⁻¹ | weak |
| Broad shoulder | " | 1,725 cm⁻¹ | weak |
| Broad shoulder | " | 1,685 cm⁻¹ | weak |
| Broad | " | 1,615 cm⁻¹ | strong |
| Sharp shoulder | " | 1,550 cm⁻¹ | medium |
| Sharp shoulder | " | 1,530 cm⁻¹ | weak-medium |
| Broad | " | 1,445 cm⁻¹ | weak-medium |
| Sharp shoulder | " | 1,440 cm⁻¹ | weak |
| Sharp | " | 1,340 cm⁻¹ | weak |
| Broad shoulder | " | 1,320 cm⁻¹ | weak |
| Broad | " | 1,285 cm⁻¹ | weak |
| Broad | " | 1,240 cm⁻¹ | weak |
| Sharp | " | 1,190 cm⁻¹ | weak |
| Broad | " | 1,110 cm⁻¹ | medium-strong |
| Sharp | " | 1,060 cm⁻¹ | weak-medium |
| Broad shoulder | " | 1,030 cm⁻¹ | weak |
| Broad shoulder | " | 990 cm⁻¹ | weak |
| Broad | " | 930 cm⁻¹ | weak |
| Sharp | " | 880 cm⁻¹ | weak |
| Sharp | " | 815 cm⁻¹ | weak-medium |
| Broad shoulder | " | 750 cm⁻¹ | weak |
| Sharp | " | 710 cm⁻¹ | weak |
| Sharp shoulder | " | 650 cm⁻¹ | weak |

EXAMPLE 10

47 g of a mixture of 1 part of tetramethylololeylguanamine and 1 part of tetramethylolstearylguanamine are heated with 120 g (0.2 mol) of polyethylene glycol of average molecular weight 600 in the presence of 1 g of glacial acetic acid to 95°–100°C in vacuo, in the course of which water and formaldehyde escape. After three-fourths hours, the reaction mixture is adjusted to pH 8 with triethanolamine, whereupon an aqueous foaming solution of the reactive surface-active agent is produced. The solution is acidified with phosphoric acid and heated to 95°–100°C, whereupon the reactive surface-active agent of the formula

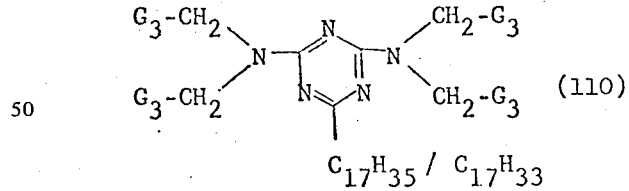

(110)

wherein $G_3$ represents a polyethylene glycol radical of average molecular weight 600, bonded via an oxygen atom, separates out.

EXAMPLE 11 a. 420 g (1.5 mols) of a technical stearylamine are reacted with 192 g (1.5 mols) of melamine for 5 hours at 180°C whilst stirring. The reaction mixture is subsequently filtered at 100°C, after which the stearylmelamine compound in the filtrate is methylolated in a known manner.

b. 12.5 g (0.025 mol) of the intermediate product from (a), of the formula

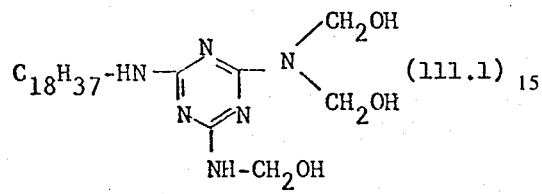

(111.1)

are sealed with 13.2 g (0.3 mol) of ethylene oxide and 100 mg of Ta(OC$_2$H$_5$)$_5$ and shaken for 16 hours in an oil bath thermostatically controlled to 80°C, whereby 22.5 g of a waxy product are obtained. Yield 87%.

The reaction product corresponds in the main to the formula

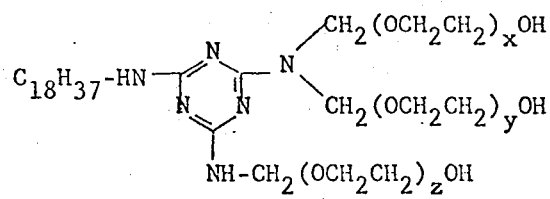

x + y + z = 12 (111.2)

EXAMPLE 12 a. 25 g (0.038 mol) of a compound of the formula

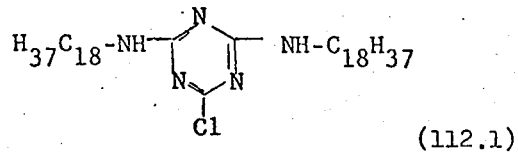

(112.1)

are reacted with 30 ml of aqueous 25% strength ammonia solution (0.4 mol) in 60 ml of dioxane in an autoclave for 3 – 6 hours at 150°C and 10 atmospheres gauge. The resulting intermediate product is then methylolated in a known manner.

b. 6.62 g (0.01 mol) of the methylol compound obtained from (a), of the formula

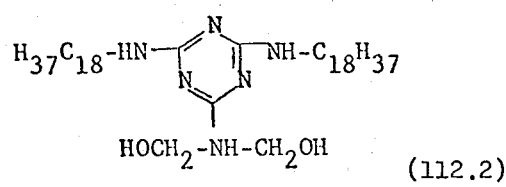

(112.2)

are sealed with 4.4 g (0.1 mol) of ethylene oxide and 100 mg of Ta(OC$_2$H$_5$)$_5$ and shaken for 16 hours in an oil bath thermostatically controlled to 90°C, whereby 11 g (yield 99%) of a brownish waxy product of the formula

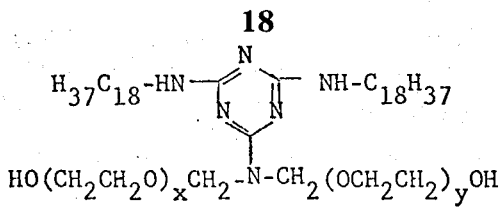

x + y = 10 (112.3)

are obtained.

EXAMPLE 13 a. 20 g of raw wool which has beforehand been rinsed with cold water are washed in 1 litre of soft water, which contains 2.5 g of the non-ionic reactive surface-active agent manufactured according to Example 1, by swishing the wool for 6 minutes at 60°C. The pH value of the wash liquor before washing is 8.6 and after washing it is 7.8. After the wool has been rinsed in warm water it retains practically no contaminations. The wash liquor, whilst still warm, is treated with 20 ml of 10% strength sulphuric acid, whereby the reactive surface-active agent is crosslinked within 30 minutes and precipitates, together with the wool grease, as a flocculent precipitate. The system is extracted twice with 50 ml of benzine at a time and the extract is separated from the clarified effluent. The benzine solution which still contains impurities in addition to the wool grease, is filtered and evaporated. 1.18 g of wool grease of acid number 12.2 are obtained as the residue.

b. The same washing experiment is carried out using, instead of the reactive surface-active agent, an addition product of 10 mols of ethylene oxide to 1 mol of nonylphenol. A wool which has been washed clean is obtained but it has not proved possible to separate the wool grease quantitatively from the wash liquor in a simple manner. Accordingly, a very cloudy wash water containing considerable amounts of emulsified wool grease is obtained.

EXAMPLE 14

If cotton poplin is padded with a solution of the reactive surface-active agent according to Example 2, which contains a little monoammonium phosphate and catalyst, dried and heated to 150°C for 5 minutes, a water-repellent effect which is fast to washing and dry-cleaning is obtained as in the preceding example.

We claim:

1. A carbamide-formaldehyde condensation product, having the formula

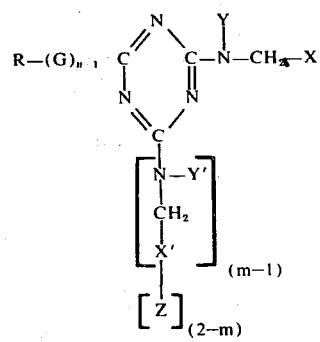

wherein R is alkyl or alkenyl with six to 22 carbon atoms, cycloalkyl with five or six ring carbon atoms, alkylphenyl with one to 12 carbon atoms in the alkyl part, phenyl or benzyl; G is oxygen or

wherein A is hydrogen or alkyl with one to four carbon atoms; Z is halogen or

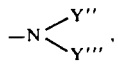

Y, Y', Y'' and Y''' each represent hydrogen, —CH$_2$—O—Q, wherein Q is hydrogen or alkyl with one to four carbon atoms, or —CH$_2$—X''; X, X' and X'' each represent a monoalkylene glycol or polyalkylene glycol radical bonded via an oxygen atom and having an average molecular weight of at most 2,000 and two to four carbon atoms per alkylene unit; and $n$ and $m$ each is 1 or 2.

2. A carbamide-formaldehyde condensation product according to claim 1, having the formula

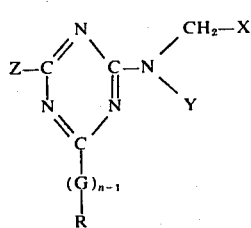

wherein Z, X, Y, G, R and $n$ have the meaning indicated in claim 1.

3. A carbamide-formaldehyde condensation product according to claim 2, having the formula

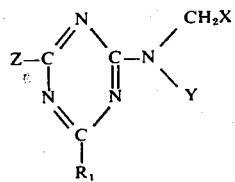

wherein R$_1$ is alkyl or alkenyl with six to 22 carbon atoms or phenyl and X, Y and Z have the meaning indicated in claim 2.

4. A carbamide-formaldehyde condensation product according to claim 3, having the formula

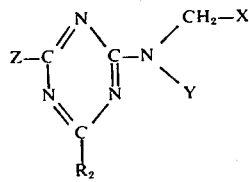

wherein R$_2$ is alkyl with 10 to 18 carbon atoms and X, Y and Z have the meaning indicated in claim 3.

5. A carbamide-formaldehyde condensation product according to claim 1, having the formula

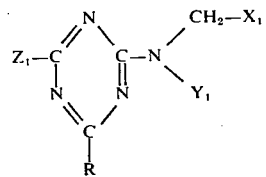

wherein Z$_1$ is chlorine or

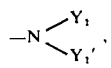

Y$_1$ and Y$_1$' each are hydrogen, —CH$_2$OQ or —CH$_2$—X$_1$, and X$_1$ is a polyethylene glycol radical of average molecular weight 105 to 1,500, and R and Q have the meaning indicated in claim 1.

6. A carbamide-formaldehyde condensation product according to claim 5, having the formula

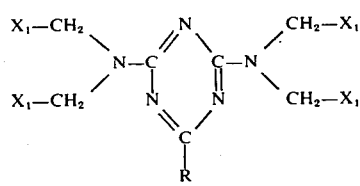

wherein R and X$_1$ have the meaning indicated in claim 5.

7. A carbamide-formaldehyde condensation product according to claim 6, having the formula

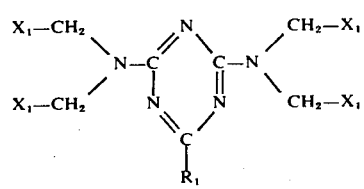

wherein R$_1$ and X$_1$ have the meaning indicated in claim 6.

8. A carbamide-formaldehyde condensation product according to claim 7, having the formula

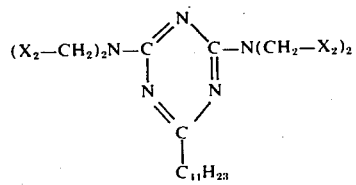

wherein X$_2$ is a polyethylene glycol radical of average molecular weight 300 bonded via an oxygen atom.

* * * * *